(12) United States Patent
McCauley (10) Patent No.: US 9,348,753 B2
(45) Date of Patent: May 24, 2016

(54) CONTROLLING PREFETCH AGGRESSIVENESS BASED ON THRASH EVENTS

(71) Applicant: Advanced Micro Devices, Inc., Sunnyvale, CA (US)

(72) Inventor: Donald W McCauley, Lakeway, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 399 days.

(21) Appl. No.: 13/648,733

(22) Filed: Oct. 10, 2012

(65) Prior Publication Data

US 2014/0101388 A1 Apr. 10, 2014

(51) Int. Cl.
*G06F 12/00* (2006.01)
*G06F 12/08* (2016.01)

(52) U.S. Cl.
CPC .................................. *G06F 12/0862* (2013.01)

(58) Field of Classification Search
CPC .................................................. G06F 12/0862
USPC .......................................................... 711/137
See application file for complete search history.

(56) References Cited

U.S. PATENT DOCUMENTS

| | | | |
|---|---|---|---|
| 5,664,147 A | 9/1997 | Mayfield | |
| 6,438,656 B1 | 8/2002 | Arimilli et al. | |
| 6,446,167 B1 | 9/2002 | Mayfield et al. | |
| 6,449,698 B1 | 9/2002 | Deshpande et al. | |
| 6,643,743 B1 | 11/2003 | Hum et al. | |
| 8,006,040 B2 * | 8/2011 | Sasamoto | 711/137 |
| 9,116,815 B2 | 8/2015 | McCauley et al. | |
| 2003/0004683 A1 * | 1/2003 | Nemawarkar | 702/186 |
| 2004/0117557 A1 | 6/2004 | Paulraj et al. | |
| 2004/0123043 A1 * | 6/2004 | Rotithor et al. | 711/137 |
| 2005/0071542 A1 | 3/2005 | Weber et al. | |
| 2006/0112229 A1 * | 5/2006 | Moat | G06F 12/126 711/137 |
| 2007/0174555 A1 | 7/2007 | Burtscher et al. | |
| 2007/0288697 A1 | 12/2007 | Keltcher | |
| 2008/0046659 A1 * | 2/2008 | Hsu | 711/137 |
| 2009/0006813 A1 | 1/2009 | Singhal | |
| 2009/0019229 A1 * | 1/2009 | Morrow et al. | 711/137 |
| 2010/0169606 A1 | 7/2010 | Deneau | |
| 2011/0072218 A1 | 3/2011 | Manne et al. | |
| 2011/0131380 A1 * | 6/2011 | Rallens et al. | 711/137 |
| 2012/0054448 A1 | 3/2012 | Thompson et al. | |
| 2012/0066455 A1 | 3/2012 | Punyamurtula et al. | |
| 2012/0084511 A1 | 4/2012 | Dooley et al. | |
| 2014/0052927 A1 | 2/2014 | McCauley | |

OTHER PUBLICATIONS

Fei Gao et al., "Two-Level Data Prefetching", International Conference on Computer Design, Oct. 7, 2007, 7 pages.
International Search Report and Written Opinion correlating to PCT/US2013/055119, Dated Dec. 9, 2013, 9 pages.
NPL: Stefan G. Berg, "Cache Prefetching", Technical Report UW-CSE Feb. 2, 2004, University of Washington, Feb. 2002, 30 pages.

* cited by examiner

*Primary Examiner* — Prasith Thammavong (57) ABSTRACT

A method and apparatus for controlling the aggressiveness of a prefetcher based on thrash events is presented. An aggressiveness of a prefetcher for a cache is controlled based upon a number of thrashed cache lines that are replaced by a prefetched cache line and subsequently written back into the cache before the prefetched cache line has been accessed.

17 Claims, 6 Drawing Sheets

CONTROLLING PREFETCH AGGRESSIVENESS BASED ON THRASH EVENTS

CROSS REFERENCE TO RELATED APPLICATIONS

This application relates to U.S. patent application Ser. No. 13/528,302 entitled "DATA CACHE PREFETCH THROTTLE" filed Jun. 20, 2012, which is incorporated herein by reference and U.S. patent application Ser. No. 13/588,622 entitled "DATA CACHE PREFETCH HINTS" filed Aug. 17, 2012, which is incorporated herein by reference.

BACKGROUND

This application relates generally to processing systems, and, more particularly, to controlling the aggressiveness of prefetchers in processing systems.

Many processing devices utilize caches to reduce the average time required to access information stored in a memory. A cache is a smaller and faster memory that stores copies of instructions or data that are expected to be used relatively frequently. For example, central processing units (CPUs) are generally associated with a cache or a hierarchy of cache memory elements. Other processors, such as graphics processing units or accelerated processing units, can also implement cache systems. Instructions or data that are expected to be used by the CPU are moved from (relatively large and slow) main memory into the cache. When the CPU needs to read or write a location in the main memory, it first checks to see whether a copy of the desired memory location is included in the cache memory. If this location is included in the cache (a cache hit), then the CPU can perform the read or write operation on the copy in the cache memory location. If this location is not included in the cache (a cache miss), then the CPU needs to access the information stored in the main memory and, in some cases, the information can be copied from the main memory and added to the cache. Proper configuration and operation of the cache can reduce the average latency of memory accesses to a value below the main memory latency and close to the cache access latency.

A prefetcher can be used to populate the lines in the cache before the information in these lines has been requested from the cache. The prefetcher can monitor memory requests associated with applications running in the CPU and use the monitored requests to determine or predict that the CPU is likely to access a particular sequence of memory addresses in the main memory. For example, the prefetcher may detect sequential memory accesses by the CPU by monitoring a miss address buffer that stores addresses of previous cache misses. The prefetcher then fetches the information from locations in the main memory in a sequence (and direction) determined by the sequential memory accesses in the miss address buffer and stores this information in the cache so that the information is available before it is requested by the CPU. Prefetchers can keep track of multiple streams and independently prefetch data for the different streams.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

A cache is a smaller and faster memory that stores copies of instructions or data that are expected to be used relatively frequently. Many processing devices utilize caches to reduce the average time required to access information stored in a memory. Lines can be retrieved from the memory and stored in the cache in response to a cache miss. A prefetcher can also be used to populate the lines in the cache before the information in these lines has been requested from the cache. Thus, at least two different types of processes—fetching and prefetching—can be used to populate the lines in a cache. Fetching typically refers to the process of retrieving a cache line from memory in response to a cache miss. Pre-fetching typically refers to the process of retrieving cache lines from memory that are expected to be requested in the future, e.g., based on a pattern of previous cache misses. The two types of processes may conflict with each other in some circumstances. The disclosed subject matter is directed to addressing the effects of one or more of the problems set forth above.

In some embodiments, a method is provided for controlling the aggressiveness of a prefetcher based upon thrash events. Some embodiments of the method include controlling an aggressiveness of a prefetcher for a cache based upon a number of thrashed cache lines that are replaced by a prefetched cache line and subsequently written back into the cache before the prefetched cache line has been accessed.

In some embodiments, an apparatus is provided for controlling the aggressiveness of a prefetcher based upon thrash events. Some embodiments of the apparatus include a thrash detector configurable to control an aggressiveness of a prefetcher for a cache based upon a number of thrashed cache lines that are replaced by a prefetched cache line and subsequently written back into the cache before the prefetched cache line has been accessed.

In some embodiments, a computer readable media is provided that includes instructions that when executed can configure a manufacturing process used to manufacture a semiconductor device configurable to control the aggressiveness of a prefetcher based upon thrash events. Some embodiments of the semiconductor device include a thrash detector configurable to control an aggressiveness of a prefetcher for a cache based upon a number of thrashed cache lines that are replaced by a prefetched cache line and subsequently written back into the cache before the prefetched cache line has been accessed.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the disclosed embodiments with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

Fetching cache lines in response to a cache miss and prefetching lines into the cache may conflict with each other in some circumstances. For example, a line may be fetched from the memory and stored in the cache in response to a cache miss that occurs when a processor core or lower level cache requests the information in the line but this information is not in the cache. The prefetcher for the cache may subsequently prefetch one or more cache lines that displace the line that was fetched into the cache in response to the cache miss. If the fetched line is evicted by the prefetched line before the fetched line is accessed by the processor core or lower level cache, the displaced fetched line needs to be re-fetched when the processor core or lower level cache attempts to access this line. Re-fetching the evicted cache lines from higher-level caches or DRAM exacts a significant cost in performance, e.g., in decreased instructions-per-cycle, increased access latency, reduced cache bandwidth, or reduced DRAM bandwidth.

The effects of conflicts between fetching and prefetching, which may be referred to herein as "thrashing" or "thrash events," may be reduced or mitigated by controlling the aggressiveness of a prefetcher for a cache based upon a number of cache lines that are replaced by a prefetched cache line and subsequently written back into the cache before the prefetched cache line has been accessed. In some embodiments, information identifying cache lines that have been evicted from the cache and replaced by a prefetched cache line are stored in a set of registers. For example, a hashed value of the address of the evicted cache line can be stored. Subsequent fill addresses of cache lines can be compared to the stored information, e.g., by hashing the fill address and comparing it to the stored hash values. A match indicates a thrash event in which the cache line is being rewritten to the cache prior to any demand access for the prefetched cache line that previously evicted the rewritten cache line. The number of thrash events may be used to control the aggressiveness of the prefetcher, e.g., by reducing the aggressiveness of the prefetcher when the number of thrash events exceeds a threshold. A stored address can be cleared when the information identifying an address of a demand access matches the stored information for a cache line.

Figure 1:
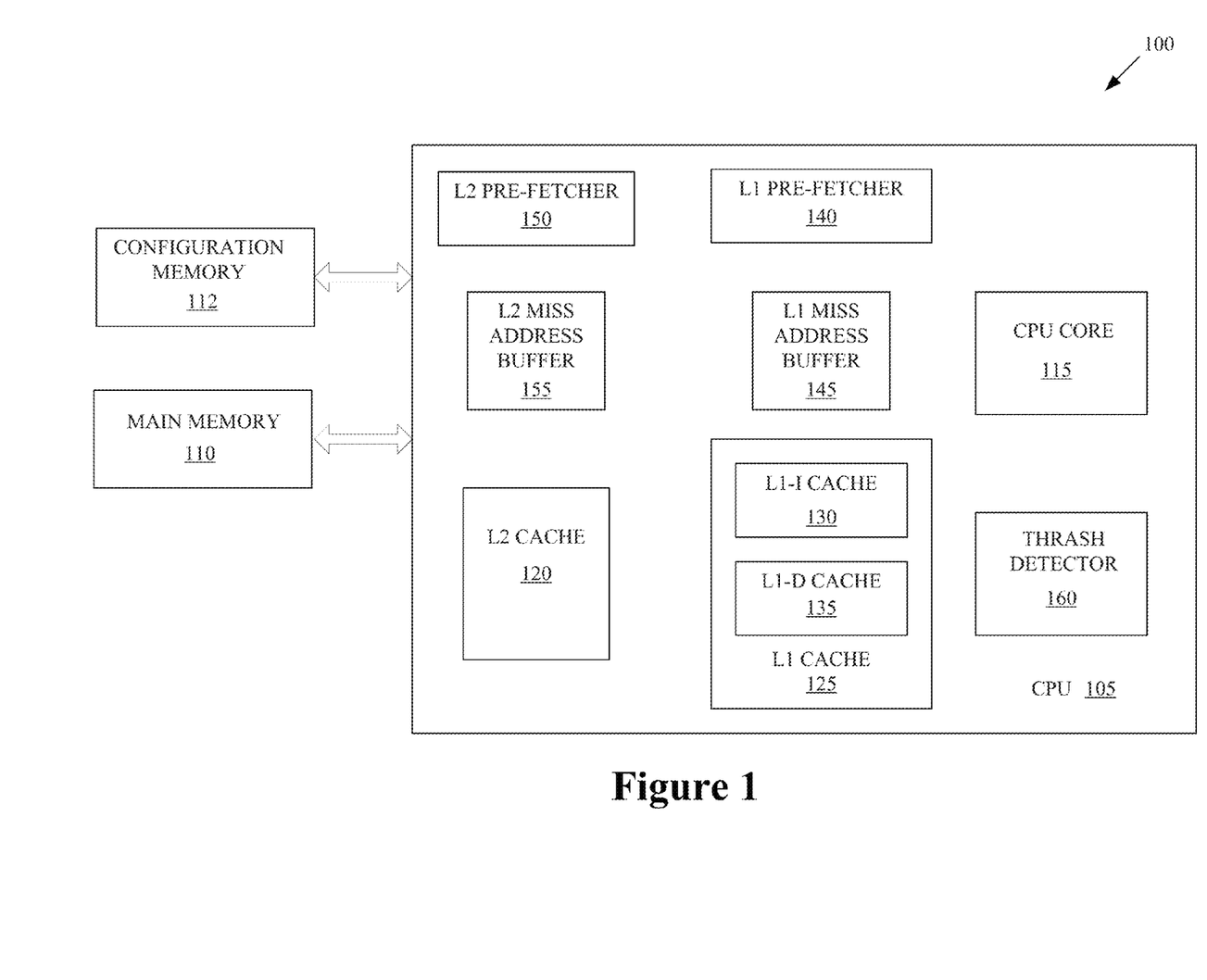
FIG. 1 conceptually illustrates a semiconductor device that may be formed in or on a semiconductor wafer, according to some embodiments.

FIG. 1 conceptually illustrates a semiconductor device 100 that may be formed in or on a semiconductor wafer (or die), according to some embodiments. The semiconductor device 100 may be formed in or on the semiconductor wafer using well known processes such as deposition, growth, photolithography, etching, planarising, polishing, annealing, and the like. As illustrated in FIG. 1, the device 100 includes a central processing unit (CPU) 105 that is configured to access instructions or data that are stored in the main memory 110. As illustrated in FIG. 1, the CPU 105 includes at least one CPU core 115 that is used to execute the instructions or manipulate the data. The CPU 105 also implements a hierarchical (or multilevel) cache system that is used to speed access to the instructions or data by storing selected instructions or data in the caches. However, persons of ordinary skill in the art having benefit of the present disclosure should appreciate that alternative embodiments of the device 100 may implement different configurations of the CPU 105, such as configurations that use external caches. Moreover, the techniques described in the present application may be applied to other processors such as graphical processing units (GPUs), accelerated processing units (APUs), and the like.

The illustrated cache system includes a level 2 (L2) cache 120 for storing copies of instructions or data that are stored in the main memory 110. As illustrated in FIG. 1, the L2 cache 120 is 16-way associative to the main memory 110 so that each line in the main memory 110 can potentially be copied to and from 16 particular lines (which are conventionally referred to as "ways") in the L2 cache 120. However, persons of ordinary skill in the art having benefit of the present disclosure should appreciate that alternative embodiments of the main memory 110 or the L2 cache 120 can be implemented using any associativity. Relative to the main memory 110, the L2 cache 120 may be implemented using smaller and faster memory elements. The L2 cache 120 may also be deployed logically or physically closer to the CPU core 115 (relative to the main memory 110) so that information may be exchanged between the CPU core 115 and the L2 cache 120 more rapidly or with less latency. Caches are typically implemented using static random access memory (SRAM). However, alternative embodiments of caches may also be implemented using other types of memory such as dynamic random access memory (DRAM).

The illustrated cache system also includes an L1 cache 125 for storing copies of instructions or data that are stored in the main memory 110 or the L2 cache 120. Relative to the L2 cache 120, the L1 cache 125 may be implemented using smaller and faster memory elements so that information stored in the lines of the L1 cache 125 can be retrieved quickly by the CPU 105. The L1 cache 125 may also be deployed logically or physically closer to the CPU core 115 (relative to the main memory 110 and the L2 cache 120) so that information may be exchanged between the CPU core 115 and the L1 cache 125 more rapidly or with less latency (relative to communication with the main memory 110 and the L2 cache 120). Persons of ordinary skill in the art having benefit of the present disclosure should appreciate that the L1 cache 125 and the L2 cache 120 represent one exemplary embodiment of a multi-level hierarchical cache memory system. Alternative embodiments may use different multilevel caches including elements such as L0 caches, L1 caches, L2 caches, L3 caches, and the like. In some embodiments, higher-level caches are inclusive of one or more lower-level caches so that lines in the lower-level caches are also stored in the inclusive higher-level cache(s).

In some embodiments, the L1 cache 125 is separated into level 1 (L1) caches for storing instructions and data, which are referred to as the L1-I cache 130 and the L1-D cache 135. Separating or partitioning the L1 cache 125 into an L1-I cache 130 for storing instructions and an L1-D cache 135 for storing data may allow these caches to be deployed closer to the entities that are likely to request instructions or data, respectively. Consequently, this arrangement may reduce contention, wire delays, and generally decrease latency associated with instructions and data. In some embodiments, a replacement policy dictates that the lines in the L1-I cache 130 are replaced with instructions from the L2 cache 120 and the lines in the L1-D cache 135 are replaced with data from the L2 cache 120. However, persons of ordinary skill in the art should appreciate that an alternative embodiment of the L1 cache 125 may not be partitioned into separate instruction-only and data-only caches 130, 135.

The CPU 105 also includes an L1 prefetcher 140 that can be used to populate lines in one or more of the L1 caches 125, 130, 135. In some embodiments, the L1 prefetcher 140 is configured to prefetch lines into the data cache 135 and in that case it may be referred to as an L1 data cache prefetcher 140. In FIG. 1, the L1 prefetcher 140 is depicted in as a separate logical element within the CPU 105. However, persons of ordinary skill in the art having benefit of the present disclosure should appreciate that the L1 prefetcher 140 may alternatively be implemented as a part of other logical elements. For example, the L1 prefetcher 140 may be implemented as a part of the logic of the L1-D cache 135. In some embodiments, the L1 prefetcher 140 monitors memory requests associated with applications running in the CPU core 115. For example, the L1 prefetcher 140 can monitor memory requests that result in cache hits or misses, which may be recorded in a L1 miss address buffer 145. The L1 prefetcher 140 may determine or predict that the CPU core 115 is likely to access a particular sequence of memory addresses in the main memory 110. For example, the L1 prefetcher 140 may detect two or more sequential memory accesses by the CPU core 115. The direction of the sequence can be determined based on the temporal sequence of the sequential memory accesses and the CPU core 115 can use this direction to predict future memory accesses by extrapolating based upon the current or previous sequential memory accesses. The L1 prefetcher 140 can then fetch the information in the predicted locations from the L2 cache 120 or the main memory 110 and store this information in an appropriate cache so that the information is available before it is requested by the CPU core 115.

The CPU 105 may also include an L2 prefetcher 150 that can be used to populate lines in the L2 cache 120. In FIG. 1, the L2 prefetcher 150 is depicted as a separate logical element within the CPU 105. However, persons of ordinary skill in the art having benefit of the present disclosure should appreciate that the L2 prefetcher 150 may alternatively be implemented as a part of other logical elements. For example, the L2 prefetcher 150 may be implemented as a part of the logic of the L2 cache 120. In some embodiments, the L2 prefetcher 150 monitors memory requests associated with applications running in the CPU core 115. For example, the L2 prefetcher 150 can monitor memory requests that result in cache hits or misses, which may be recorded in an L2 miss address buffer 155. The L2 prefetcher 150 may determine or predict that the CPU core 115 or the L1 prefetcher 140 is likely to access a particular sequence of memory addresses in the main memory 110. For example, the L2 prefetcher 150 may detect two or more sequential memory accesses by the CPU core 115, the caches 125, 130, 135, or the L1 prefetcher 140. The direction of the sequence can be determined based on the temporal sequence of the sequential memory accesses and the L2 prefetcher 150 can use this direction to predict future memory accesses by extrapolating based upon the current or previous sequential memory accesses. The L2 prefetcher 150 can then fetch the information in the predicted locations from the main memory 110 and store this information in an appropriate cache so that the information is available before it is requested by the CPU core 115, the caches 125, 130, 135, or the L1 prefetcher 140.

Figure 2:
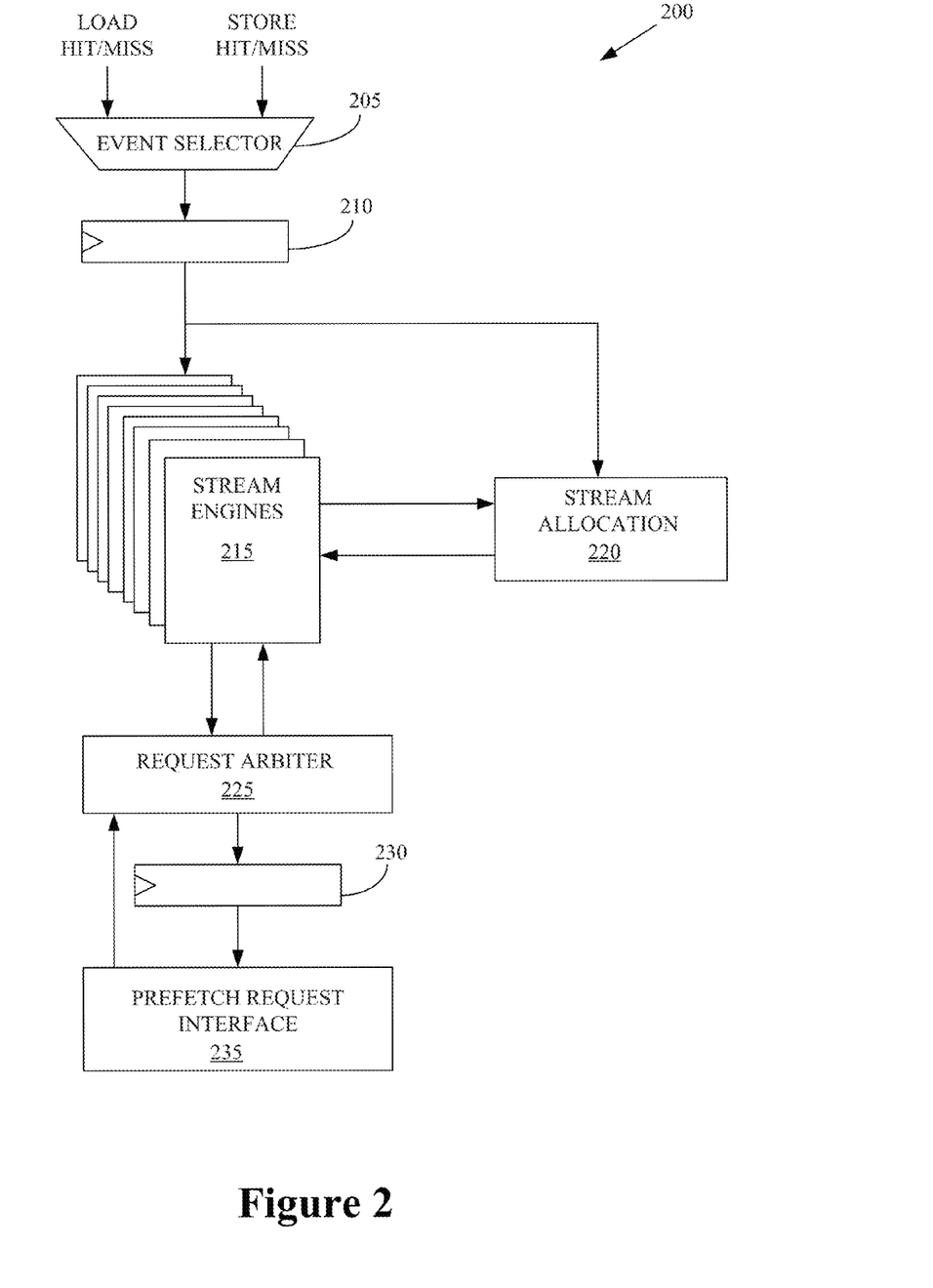
FIG. 2 conceptually illustrates a prefetcher such as the L1 prefetcher or the L2 prefetcher shown in FIG. 1, according to some embodiments.

FIG. 2 conceptually illustrates a prefetcher 200 such as the L1 prefetcher 140 or the L2 prefetcher 150 shown in FIG. 1, according to some embodiments. As illustrated in FIG. 2, the prefetcher 200 receives signals indicating particular events related to memory access requests such as hits or misses associated with a load instruction, hits or misses associated with a store instruction, and the like. Miss address buffer (MAB) events, such as hit or miss events for loads or stores, may be received or accessed by an event selector block 205, which is used to select events that are to be passed to other stages of the prefetcher 200. For example, the highest priority event may be stored in the registers 210 until they are passed to one or more stream engines 215 and a stream allocation unit 220, e.g., during a subsequent clock cycle. The priority of events can be determined using a hierarchy such as giving the highest priority to load misses and then assigning successively lower priorities to store misses, load hits, and store hits. However, persons of ordinary skill in the art having benefit of the present disclosure should appreciate that alternative hierarchies can be used to establish the priorities of the events.

As illustrated in FIG. 2, the prefetcher 200 includes one or more stream engines 215 that can be used to manage separate prefetch streams. The stream engines 215 may provide a signal to the stream allocation unit 220 to indicate that the current event either hit or missed the stream managed by the stream engine 215. If none of the existing streams indicates a hit for the MAB miss event, then the stream allocation unit 220 can allocate a new stream to a different stream engine 215 using the current event information. When a stream is first allocated, the stream engine 215 sets a page address and an offset value to the current event cache line address. The stream engine 215 can then monitor further MAB events to detect events at addresses adjacent to the current event cache line address in either direction. For example, if the current event cache line address is set to A, then the stream engine 215 looks for events at addresses in relation to the current event cache line address, e.g., addresses A+1 or A−1. If the stream engine 215 sees one of the addresses, it defines a stream in the appropriate direction (positive for A+1 and negative for A−1) and trains a new prefetch stream. In some embodiments, the stream engine 215 maintains a set of prefetch flags that indicate potential prefetches for the current stream address, as discussed herein. The prefetch flags may be set when the new prefetch stream is trained.

The prefetcher 200 may also include a request arbiter 225 that is used to arbitrate prefetch requests from the stream engines 215. In some embodiments, the request arbiter 225 is a rotating priority arbiter. However, persons of ordinary skill in the art having benefit of the present disclosure should appreciate that other types of request arbiter 225 may alternatively be implemented in the prefetcher 200. Requests can be transferred from the request arbiter 225 to a register 230 so that the request information can be provided to a prefetch request interface 235, e.g., during a subsequent clock cycle. The prefetch request interface 235 can provide feedback to the request arbiter 225, which can be used to select or arbitrate between pending requests from the stream engines 215.

As illustrated in FIG. 2, the prefetcher 200 may be configured to operate at different levels of aggressiveness. As used herein, the "aggressiveness" of a prefetcher 200 may be determined by the number of cache lines that the prefetcher 200 is configured to fetch in response to detecting a pattern of missed addresses. For example, the prefetcher 200 may be configured with a relatively high aggressiveness so that the prefetcher 200 issues requests for cache lines at up to twelve addresses that follow in sequence from the missed addresses. For another example, the prefetcher 200 may be configured with a relatively low aggressiveness so that the prefetcher 200 issues requests for cache lines at three or fewer addresses that follow in sequence from the missed addresses. In one embodiment, the prefetcher 200 may be turned off in some cases to reduce the aggressiveness to a minimum. The number of addresses that may be requested by the prefetcher 200 may be referred to as the "prefetch distance" of the prefetcher 200.

Referring back to FIG. 1, the computer system 100 may include configuration memory 112 that includes information that can be used to configure the prefetchers 140, 150. The configuration memory 112 may include registers, memory, and the like for storing configuration information for the prefetchers 140, 150. This information may be used to indicate the different levels of aggressiveness of the prefetchers 140, 150, as discussed herein. The configuration information may be created, stored in the configuration memory 112, or read from the configuration memory 112 and used to configure the prefetchers 140, 150 using software, firmware, hardware, or combinations thereof As discussed herein, requests for cache lines that are issued in response to a cache miss may conflict with prefetch requests issued in response to a sequence of missed addresses in the cache. For example, a request from the L1-D cache 135 for information at a cache line address may miss in the L2 cache 120, which may therefore issue a request to receive the missed cache line from the main memory 110. The cache line may then be fetched from the main memory 110 and stored in the L2 cache 120. However, the L2 prefetcher 150 may also issue requests for lines from the main memory 110 and these requests may cause the cache line requested by the L1-D cache 135 to be evicted from the L2 cache 120. If the cache line requested by the L1-D cache 135 is evicted by the prefetched line and subsequently written back into the L2 cache 120 before any demand requests (e.g., a load or store request) for the prefetched line, this cache line may be identified as a thrashed cache line and the eviction of the cache line may be referred to as a thrash event.

Thrashing can significantly reduce the performance of the system 100. Embodiments of the processing system may therefore implement one or more thrash detectors 160 that can be configured to control the aggressiveness of the prefetcher(s) based upon thrash events. In some embodiments, the thrash detector 160 is configured to control aggressiveness of a prefetcher for a cache based upon a number of thrashed cache lines that are replaced by a prefetched cache line and subsequently written back into the cache before the prefetched cache line has been accessed. For example, the thrash detector 160 can reduce the prefetch distance for the prefetcher(s) when the number of thrashed cache lines (or the number or rate of thrash events) exceeds a first threshold. The thrash detector 160 may also increase the prefetch distance for the prefetcher(s) in response to the number of thrashed cache lines (or the number or rate of thrash events) falls below a second threshold. In one embodiment, the first threshold may be higher than the second threshold to introduce a hysteresis. Information indicating the first or second threshold may be stored in the configuration memory 112 and the CPU 105 may implement software or instructions to define, modify, or access the first or second thresholds.

Figure 3:
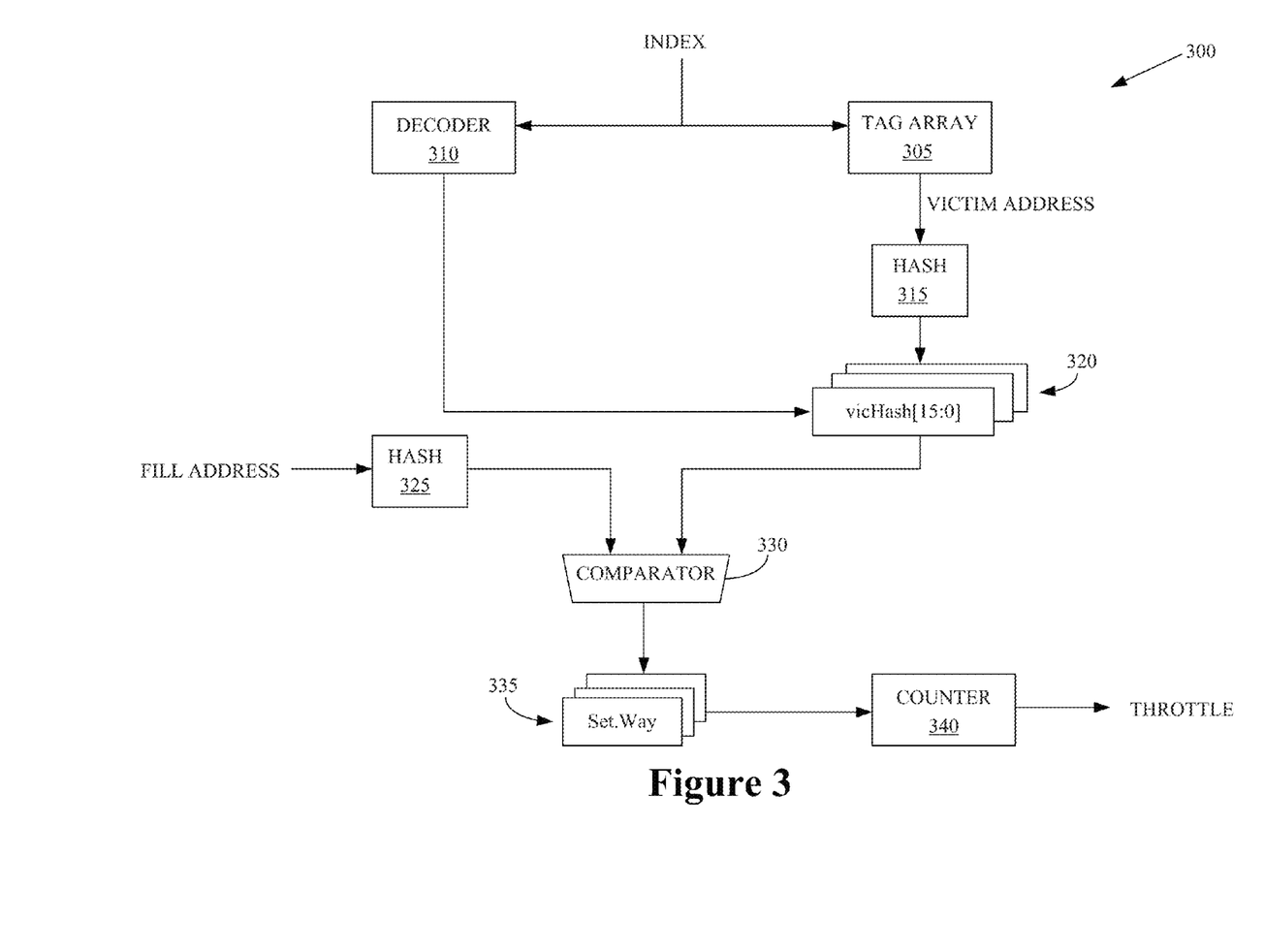
FIG. 3 conceptually illustrates a thrash detector, according to some embodiments.

FIG. 3 conceptually illustrates a thrash detector 300, according to some embodiments. Embodiments of the thrash detector 300 may be implemented in the system 100, e.g., as the thrash detector 160 shown in FIG. 1. As illustrated in FIG. 3, the thrash detector 300 may receive an index for a cache line and may use the index to access information in a tag array 305.

Figure 4:
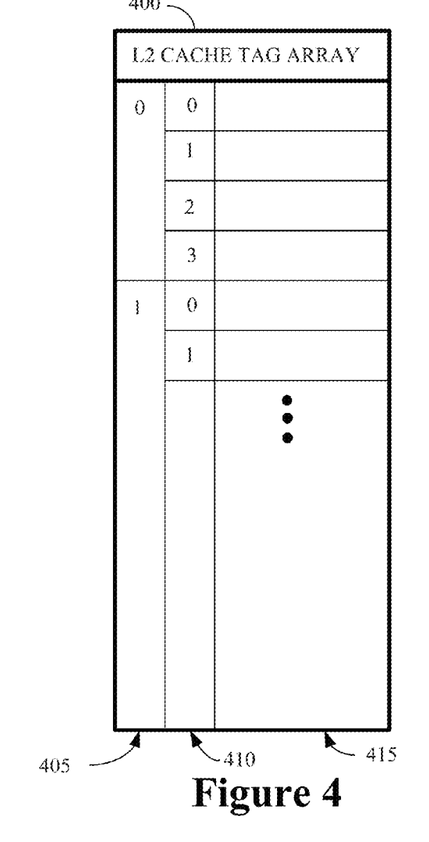
FIG. 4 conceptually illustrates an L2 cache tag array, according to some embodiments.

FIG. 4 conceptually illustrates an L2 cache tag array 400, according to some embodiments. Embodiments of the tag array 400 may be accessed by thrash detectors such as the thrash detectors 160, 300 shown in FIGS. 1 and 3. As illustrated in FIG. 4, the L2 cache is 4-way associative and so the tag array 400 includes four ways for each index. The indexes are indicated in column 405 and the ways in the L2 cache tag array 400 are indicated by the numerals 0-3 in the column 410. The column 415 indicates the tag information for the associated cache lines, which may include information or data. The associativity depicted in FIG. 4 is intended to be illustrative. Persons of ordinary skill in the art having benefit of the present disclosure should appreciate that alternative embodiments of the L2 cache tag array 400 may implement other associativities. For example, the L2 cache tag array 400 may be 16-way associative and may include 2048 sets (each corresponding to a different index) of 16 ways that are stored in a bank-interleaved manner.

Referring back to FIG. 3, the thrash detector 300 may be configured to monitor a subset of the sets of ways in the tag array 305 to detect thrash events associated with the cache lines stored in these ways. The subset of the sets may be referred to as the sampled sets. The thrash detector 300 may therefore include a decoder 310 that selects a subset of the indices for monitoring. For example, the decoder 310 may be a prime number decoder that selects sampled sets (e.g., between four and sixteen indices or sets) from the sets of ways for monitoring. Using prime numbers to select the sampled sets may allow the thrash detector 300 to avoid spurious results that may result when the sampled sets chosen by the selection algorithm correlate with memory addresses determined by a regular access pattern or stride used by code running on the system. The decoder 310 can use a value of the index to determine whether a prefetch request is going to evict a cache line in a way of one of the sampled sets. If so, a hash function 315 may be used to hash the address of the cache line that is being evicted, which may also be referred to as the victim address. Information indicating the hashed value may then be stored in a set of victim registers 320.

Figure 5:
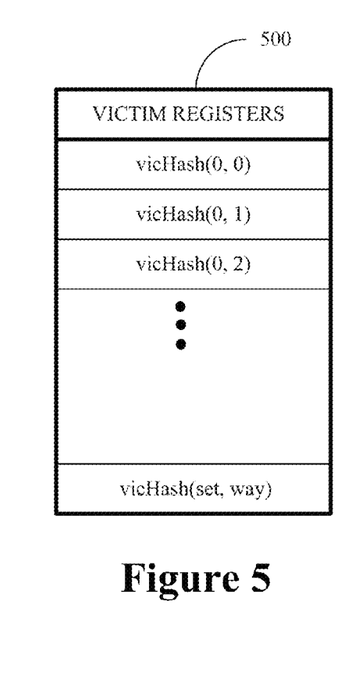
FIG. 5 conceptually illustrates a set of victim registers, according to some embodiments.

FIG. 5 conceptually illustrates a set of victim registers 500, according to some embodiments. As illustrated in FIG. 5, the victim registers 500 include entries (vicHash) for each of the ways in the sampled sets. The entries are indexed by values of the index and way. In some embodiments, each entry in the victim registers 500 includes a valid bit and a hashed value of the address that was replaced when the information in this way was evicted by a prefetch request. Entries in the victim registers 500 may be reset, e.g., in response to a demand requests that hits on the cache line in the way. Resetting an entry in the victim register 500 may include setting the valid bit to 0 and setting the hashed value of the address to 0. Alternatively, entries in the victim registers 500 may store a reserved value of 0 for invalid entries and a hashed value of the replaced address for valid entries.

Referring back to FIG. 3, the thrash detector 300 may also receive fill addresses that indicate the addresses for cache lines that are being added to the cache, e.g. in response to demand requests such as load requests or store requests. A hash function 325 may be used to hash the fill address using the same hash function that was used to hash the victim addresses. A comparator 330 in the thrash detector 300 may then be used to compare the hashed value of the demand request address to the hashed values of addresses stored in the victim registers 320. A match between the two hashed values indicates a thrashing event because the address of the cache line has been re-fetched following eviction by a prefetched cache line and before the previously fetched cache line was accessed in response to a demand request. Information indicating the thrashing event or the thrashed cache lines may be stored in a set of registers 335 that are indexed by the set and the way corresponding to the thrashing event or thrashed cache line.

The thrash detector 300 may implement a counter 340 to count the number of thrashing events or thrashed cache lines. If the counter 340 determines that the number of thrashing events or thrashed cache lines exceeds a first threshold (e.g. more than one thrashing event or thrashed cache line), the thrash detector 300 may generate a throttle signal to indicate that the aggressiveness of the prefetcher should be reduced. For example, successive throttle signals may cause the aggressiveness of the prefetcher to be reduced from a prefetch distance of twelve to eight, to four, and to two during successive cycles or iterations. The thrash detector 300 may also generate a throttle signal to indicate that the aggressiveness of the prefetcher should be increased when the counter 340 determines that the number of thrashing events or thrashed cache lines falls below a second threshold. For example, successive throttle signals may cause the aggressiveness of the prefetcher to be increased from a prefetch distance of two to four, to eight, and to twelve during successive cycles or iterations.

Figure 6:
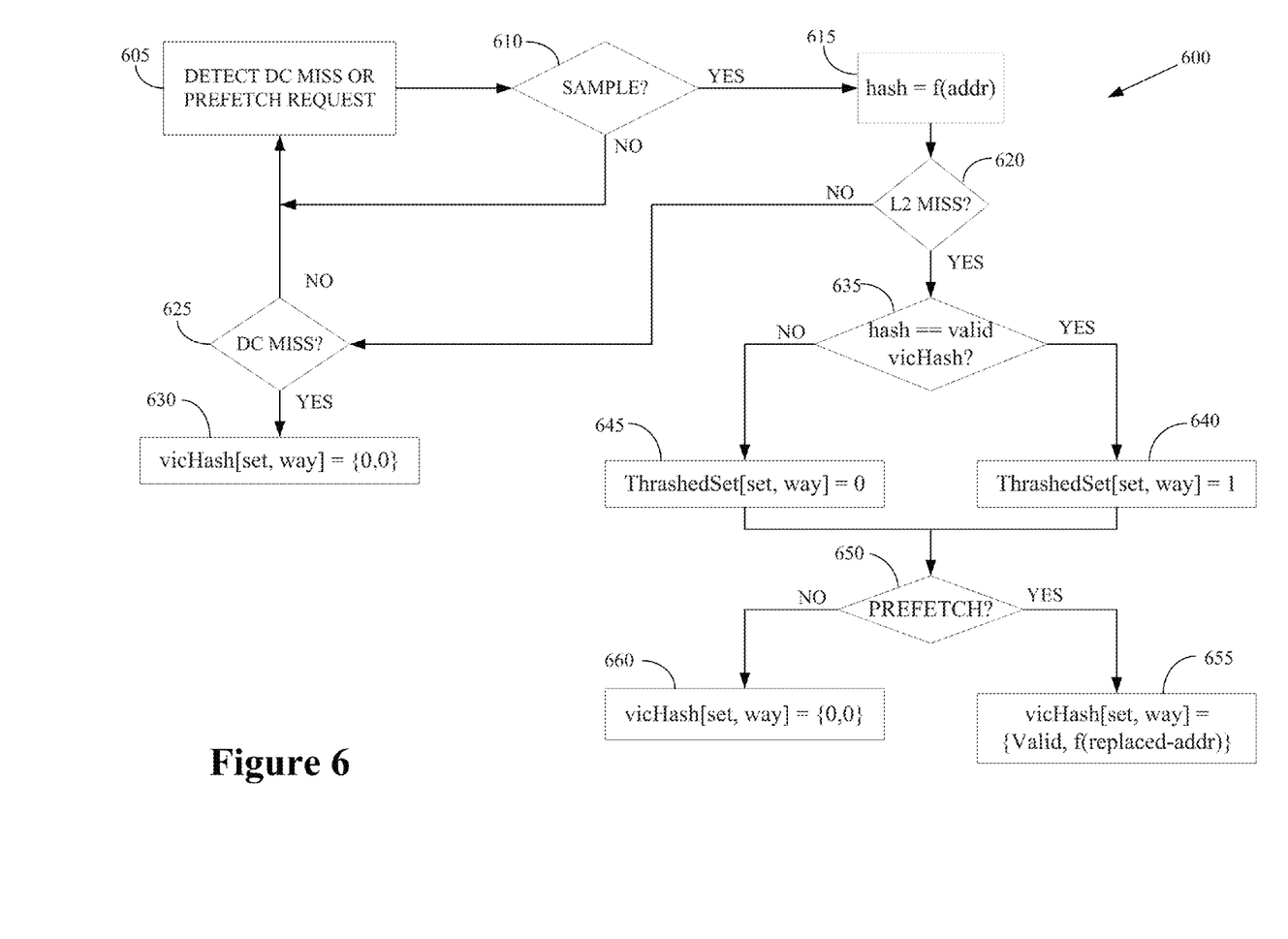
FIG. 6 conceptually illustrates a method for controlling aggressiveness of a prefetcher based upon thrashing events, according to some embodiments.

FIG. 6 conceptually illustrates a method 600 for controlling aggressiveness of a prefetcher based upon thrashing events, according to some embodiments. In some embodiments, the method 600 is implemented by a thrash detector in a system that includes a cache hierarchy formed of higher-level caches such as L2 caches and lower-level caches such as L1 data or instruction caches. However, persons of ordinary skill in the art having benefit of the present disclosure should appreciate that embodiments of the method 600 may be implemented in other types of cache systems that may or may not include a cache hierarchy. Moreover, persons of ordinary skill in the art having benefit of the present disclosure should appreciate that embodiments of the method 600 are not limited to controlling prefetch aggressiveness and in some embodiments the method 600 may be used to control other types of speculative memory access such as deep pipe accesses, wide window accesses, and the like.

In some embodiments, a thrash detector for an L2 cache detects (at 605) a hit or a miss to the L2 cache that is generated in response to an L1 data cache miss or a request by the L2 cache prefetcher. No action may be taken and the thrash detector may continue to monitor (at 605) data cache misses or prefetch requests if the hit/miss was determined (at 610) to be to an address associated with a way that is not a part of in one of the sampled sets. If the hit/miss is determined (at 610) to be to an address associated with a way that is in one of the sampled sets, the address may be hashed (at 615) using a hash function, f(addr). The thrash detector may then determine (at 620) whether the request hit or missed the L2 cache. If the request hit the L2 cache, the thrash detector determines (at 625) whether the hit to the L2 cache was in response to a lower-level data cache miss. If so, the corresponding entry in the victim register for that sampled set and way may be reset (at 630) because the L2 cache line, which may be a prefetched line, has been accessed by a demand request. If the hit to the L2 cache was not in response to a data cache miss, e.g., the hit was in response to an L2 prefetch request, no action may be taken and the thrash detector may continue to monitor (at 605) data cache misses or prefetch requests.

If the thrash detector determines (at 620) that the request missed the L2 cache, the thrash detector may determine (at 635) whether the hashed value of the requested address matches any of the valid addresses in the victim registers. If so, the thrash detector has detected (at 620) a thrash event and so the thrash detector may set (at 640) a value in the Thrashed-Set register for the corresponding set and way. If the hashed value of the requested address does not match any of the valid addresses in the victim registers, then no thrash event has occurred and the thrash detector may reset (at 645) the value of the ThrashedSet register for the corresponding set and way.

The thrash detector may also determine (at 650) whether the miss to the L2 cache was generated by a prefetch request from the L2 prefetcher. If so, then the information at the address currently stored in the way is being evicted by information prefetched by the L2 prefetcher. The thrash detector may therefore set (at 655) the corresponding entry in the victim register. Setting (at 655) the corresponding entry may include setting a valid bit and storing a hashed value of the address that is being replaced by the prefetched address. If the miss to the L2 cache was not generated by a prefetch request, then the thrash detector may reset (at 660) the corresponding entry in the victim register, e.g., by resetting the valid bit or the hashed value of the address.

Figure 7:
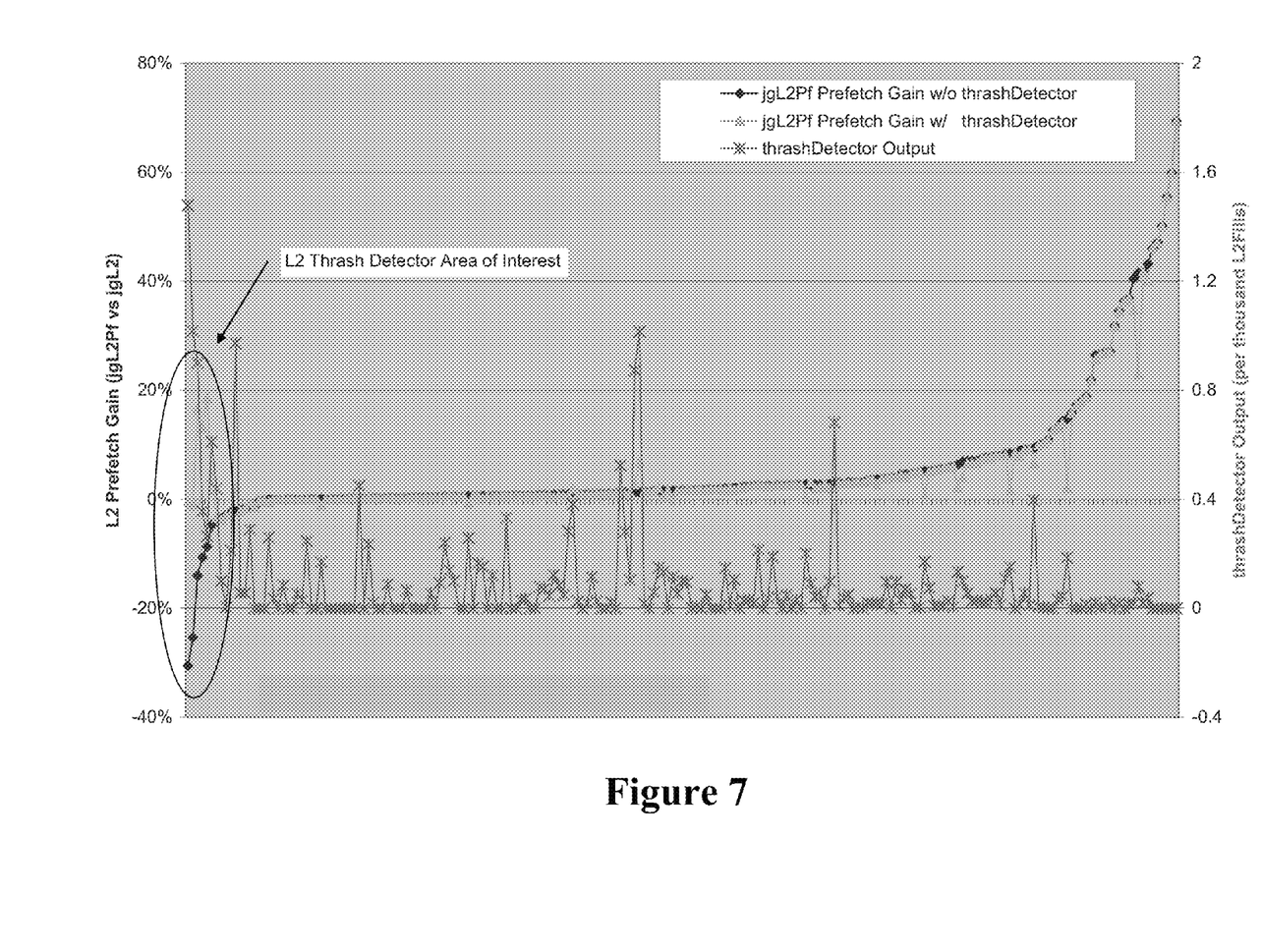
FIG. 7 shows the L2 prefetch gain achieved in a set of traces collected from an example processing system, according to some embodiments.

FIG. 7 shows the L2 prefetch gain achieved in a set of traces collected from an example processing system, according to some embodiments. The traces are ordered along the horizontal axis from the lowest prefetch gain (e.g., the change in cache performance relative to caches that do not implement prefetching) achieved without a thrash detector (on the left) to the highest prefetch gain achieved without a thrash detector (on the right). Without a thrash detector, the exemplary processing system may have a negative prefetch gain of almost 30% in some of the traces, as illustrated by the traces in the oval labeled "L2 Thrash Detector Area of Interest." Incorporating embodiments of the thrash detector described herein in the exemplary processing system may significantly improve the performance of the system. For example, as shown in FIG. 7, traces that have the highest negative prefetch gain without a thrash detector correspond to traces that have high thrash detector outputs when the thrash detector is implemented. FIG. 7 further shows that the prefetch gain is significantly improved when the thrash detector output is used to throttle aggressiveness of the prefetcher. For example, the negative prefetch gains of 10-20% can be converted into positive prefetch gains of as much as 20% by using the thrash detector output to control the aggressiveness of the prefetcher, as illustrated by comparing the traces with and without the thrash detector in the oval labeled "L2 Thrash Detector Area of Interest.".

Embodiments of processing systems that incorporate embodiments of the thrash detection techniques as described herein (such as the processor system 100) can be fabricated in semiconductor fabrication facilities according to various processor designs. In some embodiments, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on non-transitory computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk, or a hard drive), non-volatile memory, or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:
1. A method, comprising:
  identifying a number of thrashed cache lines, wherein each of the thrashed cache lines is a cache line that is both replaced by a prefetched cache line and subsequently written back into a cache before the prefetched cache line has been accessed; and
  controlling an aggressiveness of a prefetcher based on the identified number of thrashed cache lines.

2. The method of claim 1, wherein controlling the aggressiveness of the prefetcher comprises reducing a prefetch distance for the prefetcher in response to the number of thrashed cache lines exceeding a first threshold.

3. The method of claim 2, wherein controlling the aggressiveness of the prefetcher comprises increasing the prefetch distance for the prefetcher in response to the number of thrashed cache lines being below a second threshold.

4. The method of claim 1, comprising storing a hashed value of an address associated with a cache line in response to the cache line being replaced by the prefetched cache line.

5. The method of claim 4, comprising identifying the cache line as a thrashed cache line in response to determining that the cache line has been written back into the cache before the prefetched cache line has been accessed by comparing a hashed value of a fill address to the stored hashed value of the address associated with the replaced cache line.

6. The method of claim 5, comprising determining the number of thrashed cache lines for a subset of indices in the cache.

7. The method of claim 6, comprising selecting the subset of the indices in the cache using a prime number decoder.

8. The method of claim 4, comprising clearing the hashed value of the address in response to a hit on the cache line associated with the address.

9. The method of claim 8, wherein the cache is a higher level cache in a hierarchy that includes at least one lower level cache, and wherein clearing the hashed value of the address comprises clearing the hashed value of the address in response to a hit in the higher level cache corresponding to a miss of the cache line in the lower level cache.

10. The method of claim 1, comprising prefetching instructions or data from memory into the cache.

11. An apparatus, comprising:
a processor;
a cache;
a thrash detector implemented at the processor comprising:
  a comparator to compare a first value based on an address associated with a cache line to a second value based on an address associated with fill data for the cache; and
  a counter to adjust a count value based on an output of the comparator, the count value indicating a number of thrashed cache lines, wherein each of the lhrashed cache lines is a cache line that is both replaced by a prefetched cache line and subsequently written back into the cache before the prefetched cache line has been accessed; and
a prefetcher implemented at the processor to prefetch data to the cache based on an aggressiveness, the prefetcher to set the aggressiveness based on the count value.

12. The apparatus of claim 11, wherein the prefetcher is to set the aggressiveness by reducing a prefetch distance for the prefetcher in response to the number of thrashed cache lines exceeding a first threshold.

13. The apparatus of claim 12, wherein the prefetcher is to set the aggressiveness by increasing the prefetch distance for the prefetcher in response to the number of thrashed cache lines being below a second threshold.

14. The apparatus of claim 11, wherein the thrash detector further comprises at least one register for the first value, the first value comprising a hashed value of the address associated with the cache line.

15. The apparatus of claim 14, wherein the second value comprises a hashed value of the address associated with the fill data.

16. The apparatus of claim 15, wherein the thrash detector further comprises a prime number decoder having an output to select a subset of indices in the cache, and tag array to provide the address associated with the cache line based on the output of the prime number decoder.

17. A non-transitory computer readable media including instructions that when executed can configure a manufacturing process used to manufacture a semiconductor device comprising:
a thrash detector comprising:
  a comparator to compare a first value based on an address associated with a cache line to a second value based on an address associated with fill data for the cache; and
  a counter to adjust a count value based on an output of the comparator, the count value indicating a number of thrashed cache lines wherein each of the thrashed cache lines is a cache line that is both replaced by a prefetched cache line and subsequenthy written back into a cache before the prefetched cache line has been accessed; and
a prefetcher to prefetch data to the cache based on an aggressiveness, the prefetcher to set the aggressiveness based on the count value.

* * * * *